(12) United States Patent
Kozuki et al.

(10) Patent No.: US 9,212,237 B2
(45) Date of Patent: Dec. 15, 2015

(54) N-VINYL LACTAM POLYMER AND METHOD FOR PRODUCING SAME

(75) Inventors: Hidekazu Kozuki, Suita (JP); Kazuhiro Okamura, Suita (JP)

(73) Assignee: NIPPON SHOKUBAI CO, LTD, Osaka (JP)

( * ) Notice: Subject to any disclaimer, the term of this patent is extended or adjusted under 35 U.S.C. 154(b) by 263 days.

(21) Appl. No.: 13/823,553

(22) PCT Filed: Sep. 16, 2011

(86) PCT No.: PCT/JP2011/071180
§ 371 (c)(1),
(2), (4) Date: Mar. 14, 2013

(87) PCT Pub. No.: WO2012/036256
PCT Pub. Date: Mar. 22, 2012

(65) Prior Publication Data
US 2013/0184424 A1 Jul. 18, 2013

(30) Foreign Application Priority Data
Sep. 17, 2010 (JP) .................................. 2010-208846
Mar. 29, 2011 (JP) .................................. 2011-071732

(51) Int. Cl.
*C08F 26/08* (2006.01)
*C08F 26/06* (2006.01)
*C08F 26/10* (2006.01)
*C08F 126/10* (2006.01)
*C08F 226/10* (2006.01)

(52) U.S. Cl.
CPC ............... *C08F 26/08* (2013.01); *C08F 26/06* (2013.01); *C08F 26/10* (2013.01); *C08F 126/10* (2013.01); *C08F 226/10* (2013.01)

(58) Field of Classification Search
CPC ........ C08F 126/10; C08F 26/06; C08F 26/08; C08F 26/10; C08F 226/10
USPC ........................................................ 526/264
See application file for complete search history.

(56) References Cited

U.S. PATENT DOCUMENTS

| 4,786,699 | A | 11/1988 | Nuber et al. |
| 5,294,686 | A * | 3/1994 | Fiarman et al. ............... 526/233 |
| 6,187,884 | B1 | 2/2001 | Kothrade et al. |
| 6,593,408 | B1 | 7/2003 | Takaki et al. |

FOREIGN PATENT DOCUMENTS

| CN | 101248095 A | 8/2008 | |
| EP | 0792890 A1 | 9/1997 | |
| EP | 1935908 A1 | 6/2008 | |
| JP | S51-37982 A * | 3/1976 | .............. C08F 26/06 |
| JP | 62-62804 A | 3/1987 | |
| JP | 10-01512 | 1/1998 | |
| JP | 11-071414 A | 3/1999 | |
| JP | 2001-031877 A | 2/2001 | |
| JP | 2002-155108 A | 5/2002 | |
| JP | 2006-299043 A | 11/2006 | |
| JP | 2006299043 A * | 11/2006 | ............ C08F 226/10 |
| JP | 2007-238918 A | 9/2007 | |
| JP | 2007-289229 A | 11/2007 | |
| JP | 2008-255147 A | 10/2008 | |
| WO | WO-2006/115116 A1 | 11/2006 | |

OTHER PUBLICATIONS

XP002724769 (English abstract for JPS51-37982) Feb. 13, 2003.
XP002724770 (English abstract for JP 2003-040928) Mar. 30, 1976.
English translation of Office Action for counterpart CN Appln. No. 201180044528.3 issued Mar. 9, 2015.
Office Action for counterpart CN Appln. No. 201180044528.3 issued Mar. 9, 2015.

* cited by examiner

*Primary Examiner* — Ling Choi
*Assistant Examiner* — Chun-Cheng Wang
(74) *Attorney, Agent, or Firm* — Novak Druce Connolly Bove + Quigg LLP

(57) ABSTRACT

The present invention provides an N-vinyl lactam polymer that is less likely to be colored (yellowing) even at high temperatures to maintain its color tone. The present invention provides an N-vinyl lactam polymer comprising a structural unit derived from an N-vinyl lactam monomer, the N-vinyl lactam polymer including a structural unit that has at least one of a hypophosphorous group and a group of hypophosphorous acid metal salt at a main chain terminal.

6 Claims, No Drawings

N-VINYL LACTAM POLYMER AND METHOD FOR PRODUCING SAME

CROSS REFERENCE TO RELATED APPLICATIONS

This application is a National Phase filing under 35 U.S.C. §371 of PCT/JP2011/071180 filed on Sep. 16, 2011; and this application claims priority to Application No. 2010-208846 filed in Japan on Sep. 17, 2010, and Application No. 2011-071732 filed in Japan on Mar. 29, 2011 under 35 U.S.C. §119; the entire contents of all are hereby incorporated by reference.

TECHNICAL FIELD

The present invention relates to an N-vinyl lactam polymer and a method for producing the same. More specifically, the present invention relates to an N-vinyl lactam polymer usable in various applications, such as polyvinyl pyrrolidone, and a method for producing the same.

BACKGROUND ART

N-vinyl lactam polymers are represented by, for example, polyvinyl pyrrolidone and used in various fields as safe functional polymers. They are used, for example, in cosmetics, medical and agrochemical intermediates, food additives, photosensitive electronic materials, and tackifiers, and also in specialized industrial applications (e.g., production of hollow fiber membranes). In particular, polyvinyl pyrrolidone having a low molecular weight is usable in these applications.

Polyvinyl pyrrolidone having a low molecular weight is generally produced by polymerization of N-vinyl-2-pyrrolidone in an aqueous medium in the presence of a metal catalyst with use of hydrogen peroxide as a polymerization initiator (see Patent Literatures 1, 2, and 3). For example, a disclosed method for producing polyvinyl pyrrolidone having a comparatively low molecular weight safely at a low temperature in a short time includes the step of polymerizing a monomer component containing vinylpyrrolidone in the presence of hydrogen peroxide, a metal catalyst, and at least one of ammonia and an amine compound (see Patent Literature 3).

The production method in which hydrogen peroxide, a metal catalyst, and at least one of ammonia and an amine compound are used, however, has a problem that the produced polyvinyl pyrrolidone is colored in brown or yellow in polymerization or storage. Such colored polyvinyl pyrrolidone is not acceptable depending on the application. The cause of coloring is presumably oxidation of a product material by hydrogen peroxide, oxidation of an amine compound, and promotion of the oxidation of the product material by ammonia in a combination system that includes hydrogen peroxide, a metal catalyst, and at least one of ammonia and an amine compound.

As a method for suppressing coloring of polyvinyl pyrrolidone during polymerization and storage, disclosed is a method having a step of treatment with a cation-exchange resin during and/or after polymerization of a monomer component containing vinylpyrrolidone in the presence of hydrogen peroxide, a metal catalyst, and at least one of ammonia and an amine compound for production of polyvinyl pyrrolidone (see Patent Literature 4). The method is industrially usable as a method for producing polyvinyl pyrrolidone that has a comparatively low molecular weight and is less likely to be colored during polymerization and storage.

A dye transfer inhibitor containing a polymer that contains 90% by mass or more of a vinyl lactam unit and has a K value of 28 or less is disclosed, the dye transfer inhibitor containing a chain transfer agent that has an acid group (see Patent Literature 5). Patent Literature 5 teaches that a chain transfer agent having an acid group is bonded to end of a polymer including a vinyl lactam unit to have an enhanced effect on a dye and exhibit its performance as a dye transfer agent especially in the presence of an anionic surfactant. Patent Literature 5 also discloses poly-N-vinylpyrrolidone that is produced with use of a mixture of 4,4'-azobis-4-cyanovaleric acid (0.94 parts) and triethanolamine (0.98 parts) as a polymerization initiator and ammonium hypophosphite as an chain transfer agent, and has a K value of 17.3.

CITATION LIST

Patent Literature

Patent Literature 1: JP-A 64-62804
Patent Literature 2: JP-A 11-71414
Patent Literature 3: JP-A 2002-155108
Patent Literature 4: JP-A 2008-255147
Patent Literature 5: JP-A 2007-238918

SUMMARY OF INVENTION

Technical Problem

Various methods for producing polyvinyl pyrrolidone have been proposed as mentioned above. Here, when an N-vinyl lactam polymer such as polyvinyl pyrrolidone is used in production of hollow fiber membranes, for example, the N-vinyl lactam polymer is molten to be added to fibers. In that case, conventional polymers, however, have a problem of yellowing during heating to high temperatures. A method for producing an N-vinyl lactam polymer that can maintain a sufficiently favorable color tone without being colored even when heated to high temperatures (e.g., melting point or higher) has not been disclosed.

The present invention has been devised in view of the above state of the art. The present invention aims to provide an N-vinyl lactam polymer that is less likely to have a change (yellowing) in its color tone even at high temperatures and can maintain the color tone, and a method for producing the same.

Solution to Problem

The present inventors have intensively studied about a polymer having a structural unit derived from an N-vinyl lactam monomer to find out that an N-vinyl lactam polymer having a structural unit that includes at least one of a hypophosphorous group and a group of hypophosphorous acid metal salt at a main chain terminal can avoid coloring even at high temperatures to maintain its color tone. The present inventors found out that the change (yellowing) in color tone is especially sufficiently suppressed at a temperature of about 200 to 270° C. The present inventors also found out that employment of a production method having a specific polymerization step in production of an N-vinyl lactam polymer efficiently produces an N-vinyl lactam polymer that is less likely to be colored even at high temperatures to maintain its color tone, thereby solving the above problem. In this manner, the present invention was completed.

Namely, one aspect of the present invention is an N-vinyl lactam polymer comprising a structural unit derived from an N-vinyl lactam monomer, the N-vinyl lactam polymer including a structural unit that has at least one of a hypophosphorous group and a group of hypophosphorous acid metal salt at a main chain terminal.

Another aspect of the present invention is an N-vinyl lactam polymer composition comprising the N-vinyl lactam polymer, the N-vinyl lactam polymer composition containing 0 to 0.1% by mass of ammonia and ammonium salt in total (ammonium equivalent) relative to 100% by mass of the N-vinyl lactam polymer composition.

Still another aspect of the present invention is a method for producing an N-vinyl lactam polymer, the method having a step of polymerizing a monomer component containing a N-vinyl lactam monomer in an aqueous solvent in the presence of at least one of a water-soluble azo polymerization initiator and a water-soluble organic peroxide and at least one of hypophosphorous acid and a metal salt of hypophosphorous acid.

The following will specifically discuss the present invention. It is to be noted that a combination of preferable embodiments of the present invention mentioned below is also a preferable embodiment of the present invention.

<N-Vinyl Lactam Polymer>

—Structural Unit Derived from an N-Vinyl Lactam Monomer—

The N-vinyl lactam polymer of the present invention is a polymer having a structural unit derived from an N-vinyl lactam monomer.

The structural unit derived from an N-vinyl lactam monomer refers to a structural unit formed by radical polymerization of an N-vinyl lactam monomer, and specifically refers to a structural unit in which a polymerizable carbon-carbon double bond of an N-vinyl lactam monomer is transformed into a carbon-carbon single bond.

The N-vinyl lactam monomer refers to a cyclic monomer having a lactam ring. Examples thereof include N-vinyl-2-pyrrolidone, N-vinyl caprolactam, N-vinyl-4-butyl pyrrolidone, N-vinyl-4-propyl pyrrolidone, N-vinyl-4-ethyl pyrrolidone, N-vinyl-4-methyl pyrrolidone, N-vinyl-4-methyl-5-ethyl pyrrolidone, N-vinyl-4-methyl-5-propyl pyrrolidone, N-vinyl-5-methyl-5-ethyl pyrrolidone, N-vinyl-5-propyl pyrrolidone, N-vinyl-5-butyl pyrrolidone, N-vinyl-4-methyl caprolactam, N-vinyl-6-methyl caprolactam, N-vinyl-6-propyl caprolactam, and N-vinyl-7-butyl caprolactam. In particular, use of at least one of N-vinyl-2-pyrrolidone and N-vinyl caprolactam is preferable because they have fine polymerizability, and a resulting polymer has favorable color-tone stability at high temperatures.

One or two or more of the above N-vinyl lactam monomers may be used.

—Structural Unit Derived from Other Monomer(s)—

The N-vinyl lactam polymer may include a structural unit derived from a monomer other than the N-vinyl lactam monomer (also referred to as other monomer(s)). The structural unit derived from other monomer(s) means a structural unit formed by radical polymerization of other monomer(s). Here, other monomer (s) may include one kind or two or more kinds of monomers.

Such other monomer(s) are not particularly limited. Examples thereof include: carboxyl group-containing monomers such as (meth)acrylic acid, maleic acid, and (meth) acrylate; sulfonic acid group-containing monomers such as vinyl sulfonic acid, vinyl sulfonic acid salt, styrenesulfonic acid, styrenesulfonic acid salt, (meth)arylsulfonic acid, and (meth)arylsulfonic acid salt; alkyl esters of (meth)acrylic acid (e.g., methyl acrylate, ethyl acrylate, methyl methacrylate, and ethyl methacrylate), monoesters of (meth)acrylic acid and glycol (e.g., hydroxyethyl methacrylate), and the like; amino group-containing monomers such as amino alkyl esters of (meth)acrylic acid (e.g., diethylaminoethyl acrylate), quaternary ammonium derivatives of amino alkyl esters of (meth)acrylic acid, quaternary ammonium derivatives of amino alkyl esters of (meth)acrylic acid, quaternary ammonium compounds of diethylaminoethyl acrylate and methylsulfate, and N-vinyl imidazole; vinyl ethers such as vinyl methyl ether and vinyl ethyl ether; amide monomers such as N-vinyl acetamide, N-vinylformamide, N-vinylcarbazole, (meth)acrylamide, N-alkyl(meth)acrylamide, N-methylol (meth)acrylamide, and N,N-methylene bis(meth)acrylamide; vinyl acetate and vinyl stearate; and monomers containing plural polymerizable carbon-carbon double bonds such as glycol diacrylate, glycol dimethacrylate, divinylbenzene, glycol diallylether.

Here, examples of the salt include metal salts, ammonium salts, and organic amine salts. Examples of the metal salts include: alkali metal salts such as lithium salts, sodium salts, potassium salts; alkaline earth metal salts such as calcium salts and magnesium salts; and transition metal salts. Preferable among these are alkali metal salts. In view of more sufficient suppression of odors and coloring (yellowing) during heating, ammonium salts are preferably not used.

Here, (meth)acrylic acid herein refers to methacrylic acid or acrylic acid, (meth)arylsulfonic acid refers to metharylsulfonic acid or arylsulfonic acid, (meth)acrylamide refers to methacrylamide or acrylamide, and (meth)acrylate refers to methacrylate or acrylate.

The proportion of the structural unit derived from an N-vinyl lactam monomer is preferably 50 to 100% by mass relative to 100% by mass of the structural unit derived from all the monomers in the N-vinyl lactam polymer (the sum of the structural unit derived from an N-vinyl lactam monomer and the structural unit(s) derived from other monomer(s)). With such proportion, when the obtained polymer is used in production of hollow fiber membranes, for example, the productivity is further enhanced. The proportion is more preferably 80 to 100% by mass, and still more preferably 90 to 100% by mass. The proportion is particularly preferably 100% by mass, that is, the N-vinyl lactam polymer is a homopolymer of an N-vinyl lactam monomer.

The proportion of the structural unit(s) derived from other monomer(s) is preferably 0 to 50% by mass, more preferably 0 to 20% by mass, still more preferably 0 to 10% by mass, and particularly preferably 0% by mass relative to 100% by mass of the structural units derived from all the monomers in the N-vinyl lactam polymer.

In the case where the structural unit(s) derived from other monomer(s) have a salt of an acid group such as a salt of a carboxyl group and a salt of a sulfonic acid group, the mass-based proportion (% by mass) of structural units relative to the structural units derived from all the monomers is calculated as the corresponding acids (acid equivalent). For example, in the case of the structural unit derived from sodium acrylate, the mass based proportion (% by mass) of the structural unit derived from acrylic acid that is the corresponding acid is calculated. Further, in the case where the structural unit(s) of other monomer(s) have a salt of an amino group, similarly, the mass-based proportion (% by mass) of the structural unit (s) derived from the corresponding amine relative to the structural units derived from all the monomers is calculated (amine equivalent).

Preferably, the N-vinyl lactam polymer does not contain an ammonium salt structure (e.g., ammonium salt structure of an acid such as $-COONH_4^+$ and $-SO_3NH_4^+$) for the purpose of further sufficiently suppressing odors and coloring (yellowing) during heating. The proportion of the ammonium salt structure (the mass of $NH_4$ is calculated) in the N-vinyl lactam polymer is preferably 0 to 0.001% by mass relative to 100% by mass of the N-vinyl lactam polymer (relative to 100 parts by mass of solids in the case of a composition such as an aqueous solution).

—Structural Unit Including at Least One of a Hypophosphorous Group and a Group of Hypophosphorous Acid Metal Salt—

The N-vinyl lactam polymer has a structural unit including at least one of a hypophosphorous group and a group of hypophosphorous acid metal salt at a main chain terminal. That is, the N-vinyl lactam polymer has a structural unit including at least one group selected from the group consisting of hypophosphorous groups and groups of hypophosphorous acid metal salts, at a main chain terminal of the polymer molecule. The presence of the structural unit at a main chain terminal enables to suppress coloring (yellowing) of the N-vinyl lactam polymer when heated.

Here, the structural unit including at least one of a hypophosphorous group and a group of hypophosphorous acid metal salt at a main chain terminal refers to at least one structural unit selected from the group consisting of phosphinic acid groups (represented by —PH(=O)(OH)) and groups of phosphinic acid metal salts (represented by —PH(=O)(ONa) in the case of sodium phosphinate, for example). The N-vinyl lactam polymer preferably has a group of hypophosphorous acid metal salt at a main chain terminal.

Examples of the metal salt include: alkali metal salts such as lithium salts, sodium salts, and potassium salts; alkaline earth metal salts such as calcium salts and magnesium salts; and transition metal salts. Preferable among these are alkali metal salts.

The structural unit including at least one of a hypophosphorous group and a group of hypophosphorous acid metal salt at a main chain terminal can be converted to a desired acid or metal salt by addition of an acid or base after formation of a hypophosphorous (salt) group at a main chain terminal of a polymer. Similarly, it can also be exchanged by treatment with an ion-exchange resin or the like.

In the N-vinyl lactam polymer, the proportion of a structural unit including at least one of a hypophosphorous group and a group of hypophosphorous acid metal salt present at a main chain terminal (molecular end) is preferably 0.01% by mass or more, more preferably 0.1% by mass or more, and still more preferably 0.3% by mass or more relative to 100% by mass of the total weight of the N-vinyl lactam polymer. The proportion is preferably 10% by mass or less, more preferably 7% by mass or less, and still more preferably 6% by mass or less.

In calculation of the mass (% by mass) of a phosphorus-containing structural unit at a main chain terminal relative to the total mass of the N-vinyl lactam polymer, the calculation should be performed in the acid or amine equivalent when it comes under the above case.

An exemplary method for forming a structural unit including at least one of a hypophosphorous group and a group of hypophosphorous acid metal salt at a main chain terminal of the N-vinyl lactam polymer is preferably polymerization of a monomer component including an N-vinyl lactam monomer in the presence of a reducing agent including at least one of hypophosphorous acid (phosphinic acid), hypophosphite (phosphinate) and hydrates of these. In such a case, a structural unit including at least one of a hypophosphorous group and a group of hypophosphorous acid metal salt at a main chain terminal is incorporated in the polymer molecule as a reducing agent strip.

The structural unit including at least one of a hypophosphorous group and a group of hypophosphorous acid metal salt at a main chain terminal of the N-vinyl lactam polymer can be analyzed, for example, by $^{31}$P-NMR. Specifically, a method described later may be employed.

In the case of using a compound serving as a reducing agent twice or more such as hypophosphorous acid (salt), as the reducing agent, a phosphorus-containing structural unit may be formed at a position other than the molecular end of the N-vinyl lactam polymer (for example, a sodium phosphinate group may be incorporated into a molecule, in addition to a molecular end, as —P(=O)(ONa)—). Also in this case, a phosphorus-containing structural unit at a molecular end can be analyzed by $^{31}$PNMR or the like.

—Other Structural Unit(s)—

The N-vinyl lactam polymer may have other structural unit(s) in addition to a structural unit derived from the monomer and a structural unit including at least one of a hypophosphorous group and a group of hypophosphorous acid metal salt. Examples of the other structural unit(s) include a structural unit derived from a polymerization initiator and a structural unit derived from a reducing agent other than the hypophosphorous acid (salt), namely, structural units derived from raw materials other than the monomer and hypophosphorous acid (salt).

The proportion of such other structural unit(s) is preferably 0.1 to 10% by mass relative to 100% by mass of the N-vinyl lactam polymer.

The structural unit derived from a polymerization initiator is typically formed at an initial end of a polymer. Since coloring (yellowing) during heating is likely to increase when a carboxyl group is formed at a main chain terminal of the polymer, the main chain terminal of the polymer preferably does not have a carboxyl group (salt). Accordingly, a polymerization initiator preferably does not have a carboxyl group (salt).

—Molecular Weight and Physical Properties of N-Vinyl Lactam Polymer—

The N-vinyl lactam polymer preferably has a K value of 3 to 100 based on the Fikentscher method. The K value is more preferably 4 to 60, still more preferably 5 to 40, and particularly preferably 5 to 35.

In view of suppressing the viscosity of a dispersion in which dispersion objects are dispersed, the K value is preferably less than 15. The K value is more preferably 14 or less, still more preferably less than 14, particularly preferably 13.5 or less, and most preferably less than 13.5.

The embodiment where the N-vinyl lactam polymer has a K value of 5 or more but less than 15 is a preferable embodiment of the present invention. The lower limit of the K value is more preferably 7 or more, particularly preferably 8 or more, and most preferably 9 or more.

The K value based on the Fikentscher method is determined as follows.

In the case where the K value is less than 20, the viscosity of a 5% (g/100 ml) solution is measured. In the case where the K value is 20 or more, the viscosity of a 1% (g/100 ml) solution is measured.

The concentration of a test sample was determined in the dry matter equivalent.

In the case where the K value is 20 or more, 1.0 g of a test sample is accurately measured and put into a 100-ml volumetric flask. Distilled water is added to the flask at ambient temperature, and the mixture is shaken until the test sample is completely dissolved therein. Then, distilled water is further added such that the amount of the solution becomes correctly 100 ml. The test sample solution is left to stand in a constant temperature bath (25±0.2° C.) for 30 minutes. Then, the viscosity thereof is measured with an Ubbelohde viscometer. The time required for the solution to flow between two marked lines (flow time of the solution) is measured. The measurement is performed for several times, and the average value is calculated. For measurement of a relative viscosity, the same measurement is performed on distilled water (flow time of water). The two obtained flow times are corrected based on the Hagenbach-Couette correction. In the case where the K value is less than 20, the flow time of the solution was similarly obtained, except that the mass of the test sample is changed to 5.0 g.

Based on thus obtained flow times of the solution and water, the K value is calculated using the following equation.

$$K \text{ value} = \frac{\sqrt{300C\log Z + (C + 1.5C\log Z)^2} + 1.5C\log Z - C}{0.15C + 0.003C^2}$$

In the equation, Z represents a relative viscosity (ηrel) of the solution having a concentration of C. The C indicates a concentration (%: g/100 ml).

The relative viscosity (ηrel) is calculated using the below equation.

ηrel=(flow time of the solution)÷(flow time of water)

The N-vinyl lactam polymer (or an N-vinyl lactam polymer composition described later) has excellent color tone under high temperature conditions, which means the N-vinyl lactam polymer (or an N-vinyl lactam polymer composition described later) is less likely to be colored. For example, the yellow index (YI) after heating at 260° C. under aeration of nitrogen for 60 minutes is preferably 25 or less and more preferably 20 or less. The b value in the Hunter Lab color space is preferably 13 or less and more preferably 10 or less.

The yellow index (YI) and the b value in the Hunter Lab color space are determined by the method described later.

<Method for Producing N-Vinyl Lactam Polymer>

The N-vinyl lactam polymer of the present invention can be produced by polymerization of a monomer component containing an N-vinyl lactam monomer (also referred to as a monomer composition). In another method, after production of a polymer not containing a structural unit derived from an N-vinyl lactam monomer, the polymer may be modified to have a structural unit derived from an N-vinyl lactam monomer. A preferable method for producing the N-vinyl lactam polymer includes a step of polymerizing a monomer component containing an N-vinyl lactam monomer in the presence of a polymerization initiator.

The N-vinyl lactam monomer in the monomer component is as mentioned above. As the monomer component, one or two or more kinds of monomers other than the N-vinyl lactam monomer (also referred to as other monomer(s)) may be included. Such other monomer(s) are also as mentioned above.

In the monomer component, the proportion (use rate) of the N-vinyl lactam monomer is preferably 50 to 100% by mass relative to 100% by mass of the whole monomer component (N-vinyl lactam monomer and other monomer(s)). In such a case, when the obtained polymers are used for production of hollow fiber membranes, for example, the productivity of the hollow fiber membranes is further improved. The proportion is more preferably 80 to 100% by mass and still more preferably 90 to 100% by mass. The proportion is particularly preferably 100% by mass. That is, the N-vinyl lactam polymer of the present invention is preferably a homopolymer of the N-vinyl lactam monomer.

The proportion (use rate) of the other monomer(s) is preferably 0 to 50% by mass, more preferably 0 to 20% by mass, still more preferably 0 to 10% by mass, and particularly preferably 0% by mass relative to 100% by mass of the whole monomer component (N-vinyl lactam monomer and other monomer(s)).

In calculation of the proportion of other monomer(s) and the like relative to the whole monomer component (100% by mass), when the other monomer(s) have a salt of an acid group such as a salt of a carboxyl group and a salt of a sulfonic acid group, the salt of an acid group is calculated as the corresponding acid group (acid equivalent). When the other monomer(s) have salt of an amino group, the salt of an amino group is calculated as the corresponding amino group (amine equivalent).

—Polymerization Initiator—

The polymerization initiator is not particularly limited, and preferable examples thereof include water-soluble azo polymerization initiators and water-soluble organic peroxides. That is, the polymerization step is favorably carried out in the presence of at least one of water-soluble azo polymerization initiators and water-soluble organic peroxides.

Here, the phrase "water-soluble" refers to a property that one part by mass or more of a substance is dissolved in 100 parts by mass of water at 20° C. An azo polymerization initiator refers to a compound that has an azo bond and generates radicals by heat or the like. One or two or more of the azo polymerization initiators may be used. Further, one or two or more of the water-soluble organic peroxides may be used.

Examples of the water-soluble azo polymerization initiators included 2,2'-azobis[2-(2-imidazolin-2-yl)propane]dihydrochloride, 2,2'-azobis-[2-(2-imidazolin-2-yl)propane] disulfide dihydrate, 2,2'-azobis-(propane-2-carboamidine) dihydrochloride, 2,2'-azobis(2-amidinopropane) dihydrochloride, 2,2'-azobis[N-(2-carboxyethyl)-2-methylpropionamidine], 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis(1-imino-1-pyrrolidino-2-methylpropane)dihydrochloride, 2,2'-azobis{2-methyl-N-[1,1-bis(hydroxymethyl)-2-hydroxyethyl]propionamide}, 2,2'-azobis[N-(2-hydroxyethyl)-2-methylpropanamide, and 4,4'-azobis-4-cyanovaleric acid.

As the water-soluble azo polymerization initiator, those having a 10-hour half-life period temperature of 30 to 90° C. are preferable. Such an initiator enables more efficient production of an N-vinyl lactam polymer having a low molecular weight. Additionally, the obtained polymer has better color tone at high temperatures. More preferable are those having a 10-hour half-life period temperature of 40 to 70° C.

Preferably, an azo polymerization initiator having a carboxyl group is preferably not used because it may have an influence on coloring. That is, the water-soluble azo polymerization initiator (water-soluble azo compound) preferably contains no carboxyl group.

Examples of the water-soluble organic peroxides include: alkyl hydroperoxides such as tertiary butylhydroperoxide, cumene hydroperoxide, tertiary hexyl hydroperoxide, and p-menthane hydroperoxide; tertiary butylperoxy acetate; disuccinoyl peroxide; and peracetic acid. In particular, alkyl hydroperoxides are preferably used because more efficient production of an N-vinyl lactam polymer having a low molecular weight is enabled and the obtained polymer has better color tone at high temperatures. Further, tertiary butyl-hydroperoxide is more preferably used.

The organic peroxide preferably has a 10-hour half-life period temperature of 30 to 180° C. This enables more efficient production of an N-vinyl lactam polymer having a low molecular weight and allows the obtained polymer to have better color tone at high temperatures. Those having a 10-hour half-life period temperature of 40 to 170° C. are more preferable.

In the polymerization step, use of one or two or more of polymerization initiators selected from the group consisting of water-soluble azo polymerization initiators and water-soluble organic peroxides is preferable. Other polymerization initiator(s) may be used in combination. Examples of such polymerization initiator(s) include: persulfates such as sodium persulfate, potassium persulfate, and ammonium persulfate; and hydrogen peroxide.

The used amount (the total amount when plural initiators are used) of the polymerization initiator is, unless otherwise specified, preferably 15 g or less and more preferably 0.1 to 12 g relative to 1 mole of the whole monomer component.

The used amount of the polymerization initiator herein includes the used amount of the water-soluble azo polymerization initiator and water-soluble organic peroxide.

In the case where a water-soluble azo polymerization initiator is used as the polymerization initiator, the used amount of the water-soluble azo polymerization initiator is preferably 1.9 g or less relative to 1 mole of the whole monomer component. This enables more efficient production of an N-vinyl lactam polymer having a low molecular weight and allows the obtained polymer to have better color tone at high temperatures. The used amount is more preferably 1.6 g or less, still more preferably 1.2 g or less, and particularly preferably 1.1 g or less. The lower limit of the used amount is preferably 0.1 g or more and more preferably 0.2 g or more relative to 1 mole of the whole monomer component.

In the case where a water-soluble organic peroxide is used as the polymerization initiator, the used amount of the water-soluble organic peroxide is preferably 1.9 g or less relative to 1 mole of the whole monomer component. This enables more efficient production of an N-vinyl lactam polymer having a low molecular weight and allows the obtained polymer to have better color tone at high temperatures. The used amount is more preferably 1.6 g or less, still more preferably 1.2 g or less and particularly preferably 1.1 g or less. The lower limit of the used amount is preferably 0.1 g or more and more preferably 0.2 g or more relative to 1 mole of the whole monomer component.

The method of adding the polymerization initiator to a reaction system (polymerization reactor) is not particularly limited. For example, the amount of the polymerization initiator substantially continuously added during polymerization is preferably 50% by mass or more, more preferably 80% by mass or more, and still more preferably 100% by mass relative to 100% by mass of the entire used amount (the total required amount) of the polymerization initiator. That is, the entire amount is preferably continuously added. In the case where the polymerization initiator is continuously added, the dripping rate may be changed. The polymerization initiator may be directly added without being dissolved in a solvent such as water, but is preferably dissolved in a solvent such as water before addition to the reaction system (polymerization reactor).

In the present invention, "during polymerization" refers to the time after the start of polymerization and before the end of polymerization.

Here, "the start of polymerization" refers to the point where at least a part of the monomer component and at least a part of the initiator are both added to the polymerization device, and "the end of polymerization" refers to the point where addition of all the monomers to the polymerization reactor is completed.

—Reducing Agent—

The polymerization step is preferably performed in the presence of a reducing agent. Polymerization in the presence of a reducing agent enables efficient production of an N-vinyl lactam polymer having a low molecular weight.

A single reducing agent may be used alone, or a mixture of two or more reducing agents may be used. Specific examples of the reducing agent include: thiol compounds such as mercaptoethanol, thioglycerol, thioglycollic acid, 2-mercaptopropionic acid, 3-mercaptopropionic acid, thiomalic acid, octyl thioglycollate, octyl 3-mercapropropionate, 2-mercaptoethanesulfonic acid, n-dodecyl mercaptan, octyl mercaptan, and butyl thio glycolate; halides such as carbon tetrachloride, methylene chloride, bromoform, and bromotrichloromethane; secondary alcohols such as isopropanol and glycerin; phosphorus-containing compounds such as phosphorus acid, phosphite, hypophosphorous acid, hypophosphite, and hydrates of these; and lower oxides such as bisulfites (including compounds generating bisulfite when dissolved in water) (e.g., sulfurous acid, hydrogen sulfite, dithionous acid, metabisulfite, and salts thereof), and salts thereof.

Examples of the salts include metal salts, ammonium salts and organic amine salts. The salt is preferably a metal salt. Examples of the metal salt include: alkali metal salts such as lithium salts, sodium salts, and potassium salts; alkaline earth metal salts such as calcium salts and magnesium salts; and transition metal salts. Preferable among these are alkali metal salts. In view of more sufficiently suppressing odors and coloring (yellowing) by heating, ammonium salts are preferably not used.

Among the above reducing agents, since the obtained N-vinyl lactam polymer has excellent color tone at high temperatures, use of at least one of hypophosphorous acid and a metal salt of hypophosphorous acid (including hydrates of these) is preferable. That is, in the polymerization step, polymerization is preferably performed in the presence of at least one of hypophosphorous acid and a metal salt of hypophosphorous acid. In particular, in view of favorable chain transfer efficiency, use of at least one of hypophosphorous acid and alkali metal salt of hypophosphorous acid is preferable.

As mentioned above, after polymerization using hypophosphorous acid (salt) as a reducing agent, a structural unit including at least one of hypophosphorous acid and a group of hypophosphorous acid metal salt may be formed by addition of an acid or base at a main chain terminal of a polymer molecule. Alternatively, after polymerization using hypophosphorous acid (salt) as a reducing agent, a structural unit including at least one of hypophosphorous acid and a group of hypophosphorous acid metal salt may be formed by treatment using ion-exchange resin or the like, at a main chain terminal of a polymer molecule.

The used amount of the reducing agent is, unless otherwise specified, preferably 0.05 to 20 g relative to one mole of the whole monomer component. If the amount is less than 0.05 g, the molecular weight may be less controllable. If the amount is more than 20 g, the reducing agent may be left, failing to sufficiently increase the polymer purity. The used amount is more preferably 0.1 to 15 g.

In the case where at least one of hypophosphorous acid and a metal salt of hypophosphorous acid (including hydrates of these) is used as the reducing agent, the used amount (the total amount when plural reducing agents are used) of at least one of hypophosphorous acid and a metal salt of hypophosphorous acid is preferably 5.0 g or less relative to one mole of the whole monomer component. If the amount exceeds the upper limit, the amount of at least one of hypophosphorous acid and a metal salt of hypophosphorous acid not contributing to chain transfer (at least one of hypophosphorous acid and a metal salt of hypophosphorous acid, not incorporated in a polymer end) increases to increase the amount of inorganic anions, resulting in a case where the performance when used in production of hollow fiber membranes is not further improved, for example. The used amount is more preferably 4.5 g or less and still more preferably 4.0 g or less. The lower limit of the used amount is preferably 0.5 g or more and more preferably 1.0 g or more relative to one mole of the monomer.

As for the method of adding the reducing agent, the reducing agent may be added to a reaction vessel (polymerization reactor) before polymerization (initial charge). Alternatively, the entire or part of the reducing agent may be added to a reaction vessel (polymerization reactor) during polymerization. In the present invention, "before polymerization" refers to the point before the start of the polymerization and "after polymerization" refers to the point after the end of polymerization.

The amount of the reducing agent substantially continuously added to a reaction system (polymerization reactor) during polymerization is preferably 50% by mass or more, more preferably 80% by mass or more, and still more preferably 95% by mass or more relative to 100% by mass of the total used amount of the reducing agent. In the case of continuous addition of the reducing agent, the dripping rate may be changed.

—Other Additive(s)—

In the polymerization step, a heavy metal ion (or heavy metal salt) may be used as a reducing compound that serves as a cracking catalyst or the like of the polymerization initiator. The heavy metal refers to a metal having a specific gravity of 4 g/cm$^3$ or more.

Among the heavy metals, iron is preferable. As the reducing compound, preferable heavy metal salts include Mohr's salt $(Fe(NH_4)_2(SO_4)_2 \cdot 6H_2O)$ ferrous sulfate.heptahydrate, ferrous chloride, ferric chloride, at least one of copper sulfate (I) and a hydrate thereof, at least one of copper sulfate (II) and a hydrate thereof, and at least one of copper chloride (II) and a hydrate thereof.

In the case of using the heavy metal ion, the used amount thereof is preferably 0.01 to 10 ppm relative to the total mass of the polymerization reaction liquid at the completion of the polymerization reaction. If the heavy metal ion content is less than 0.01 ppm, the effect by the heavy metal ion may not be sufficiently exerted. If the heavy metal ion content is more than 10 ppm, the obtained polymer may not have further better color tone.

In the polymerization step, for the purpose of promoting the polymerization reaction and preventing hydrolysis of N-vinyl lactam, at least one of ammonia and an amine compound may be used. One kind may be used alone, or two or more kinds may be used in combination.

The at least one of ammonia and an amine compound may function as a co-catalyst in the polymerization reaction. That is, when the at least one of ammonia and an amine compound is contained in the reaction system, compared to the case where the reaction system contains no ammonia and no amine compound, progress of the polymerization reaction may be further promoted. In addition, the at least one of ammonia and an amine compound may function as a basic pH regulator in the reaction system of the polymerization reaction.

The obtained N-vinyl lactam polymer is preferably set not to contain an ammonium salt structure (e.g., ammonium salt structure of acids such as $-COONH_4^+$ and $-SO_3NH_4^+$) as far as possible, for the purpose of more sufficiently suppressing odors and coloring (yellowing) by heating. A preferable range of the ammonium salt structure (the mass is calculated as $NH_4$) in the N-vinyl lactam polymer is 0 to 0.001% by mass relative to 100% by mass of the N-vinyl lactam polymer (relative to 100 parts by mass of solids in the case of a composition such as an aqueous solution). From this point of view, in the case of using at least one of ammonia and an amine compound, use of an amine compound is preferable.

Addition of the at least one of ammonia and an amine compound may be performed by any appropriate method. For example, at least one of ammonia and an amine compound may be placed in a reaction vessel at the start of polymerization, or added sequentially during polymerization.

The ammonia may be used as gaseous substance as it is at ambient temperature, or may be used in the form of an aqueous solution (aqueous ammonia).

As the amine compound, any appropriate amine compound may be used. Specific examples thereof include primary amines, secondary amines, and tertiary amines. Only one amine compound may be used alone, or two or more amine compounds may be used in combination.

Examples of the primary amines include monoethanolamine, allylamine, isopropylamine, diaminopropylamine, ethylamine, 2-ethylhexylamine, 3-(2-ethylhexyloxy)propylamine, 3-ethoxypropylamine, 3-(diethylamino)propylamine, 3-(dibutylamino)propylamine, tetramethylethylene diamine, t-butylamine, sec-butylamine, propylamine, 3-(methylamino)propylamine, 3-(dimethylamino)propylamine, and 3-methoxypropylamine. Each of these primary amines may be used alone, or two or more of these may be used in combination.

Examples of the secondary amines include: aliphatic secondary amines such as dimethylamine, diethylamine, dipropylamine, diisopropylamine, N-methylethylamine, N-methylpropylamine, N-methylisopropylamine, N-methylbutylamine, N-methylisobutylamine, N-methylcyclohexylamine, N-ethylpropylamine, N-ethylisopropylamine, N-ethylbutylamine, N-ethylisobutylamine, N-ethylcyclohexylamine, N-methylvinylamine, and N-methylallylamine; aliphatic diamines and triamines such as N-methylethylenediamine, N-ethylethylenediamine, N,N'-dimethylethylenediamine, N,N'-diethylethylenediamine, N-methyltrimethylenediamine, N-ethyltrimethylenediamine, N,N'-dimethyltrimethylenediamine, N,N'-diethyltrimethylenediamine, diethylenetriamine, and dipropylenetriamine; aromatic amines such as N-methylbenzylamine, N-ethylbenzylamine, N-methylphenethylamine, and N-ethylphenethylamine; monoalkanolamines such as N-methylethanolamine, N-ethylethanolamine, N-propylethanolamine, N-isopropylethanolamine, N-butylethanolamine, and N-isobutylethanolamine; dialkanolamines such as diethanolamine, dipropanolamine, diisopropanolamine, and dibutanolamine; and cyclic amines such as pyrrolidine, piperidine, piperazine, N-methylpiperazine, N-ethylpiperazine, morpholine, and thiomorpholine. Among these, dialkanolamines and dialkylamines are preferable. Particularly, dialkanolamines are preferable. Among them, diethanolamine is especially preferable. Each of these secondary amines may be used alone, or two or more of these may be used in combination.

Examples of the tertiary amines include trialkanolamines such as trimethylamine, triethylamine, tripropylamine, triisopropylamine, triethanolamine, tripropanolamine, triisopropanolamine, and tributanolamine. Among these, trialkanolamines are preferable. Particularly, triethanolamine is preferable. Each of these tertiary amines may be used alone, or two or more of these may be used in combination.

The total amount of the ammonia and an amine compound is not necessarily determined because it depends on the kind of the initiator used, other raw material(s), and the like. The total amount is preferably set such that the pH value during polymerization can be kept within a range mentioned later. The used amount of ammonia is preferably reduced as far as possible.

When a copper salt is used as the heavy metal salt and the ammonia is also used, an amine complex salt of copper may be formed. Examples of the amine complex salt include diamine copper salt (e.g., $[Cu(NH_3)_2]_2SO_4 \cdot H_2O$, $[Cu(NH_3)_2]Cl$) and tetramine copper salt (e.g., $[Cu(NH_3)_4]SO_4 \cdot H_2O$, $[Cu(NH_3)_4]Cl_2$).

—Polymerization Solvent—

The polymerization step is preferably carried out in an aqueous solvent.

The aqueous solvent refers to water or a mixed solvent containing water. The mixed solvent contains preferably 50% by mass or more, more preferably 80% by mass or more of water relative to 100% by mass of the solvent. Particularly preferable as the aqueous solvent is water alone. In the case of using water alone, residues of an organic solvent are favorably avoided.

Preferable examples of the solvent usable in combination with water for polymerization include: alcohols such as methylalcohol, ethylalcohol, and isopropyl alcohol; glycerin; polyethylene glycol; amides such as dimethylformaldehyde; and ethers such as diethyl ether and dioxane. One or two or more of these may be used.

The polymerization step is preferably carried out such that the solid concentration (concentration of nonvolatile matters in the solution, determined by the method described later) after the end of the polymerization is 10 to 70% by mass, more preferably 15 to 60% by mass, and still more preferably 20 to 55% by mass relative to 100% by mass of the polymerization solution.

—Other Polymerization Conditions—

As for polymerization conditions for the polymerization step, the temperature during polymerization is preferably 70° C. or higher. When the temperature during polymerization is within this range, a residual monomer component is likely to be reduced and the dispersibility of the polymers tends to be improved. The temperature is more preferably 75 to 110° C. and still more preferably 80 to 105° C.

The temperature during polymerization is not required to be always constant throughout the course of the polymerization reaction. For example, the temperature may be the ambient temperature at the start of polymerization, then raised to the preset temperature in an appropriate heating time or at an appropriate rate of temperature rise, and kept at that temperature. Alternatively, the temperature may be changed (increased or lowered) with time throughout the course of the polymerization reaction in accordance with the method of dripping the monomer component, the initiator, and the like.

In the polymerization step, the pH during polymerization (i.e., pH of the polymerization solution used for the polymerization) is preferably 4 or more and more preferably 6 or more, in view of sufficiently suppressing impurities and byproducts. The pH is preferably 11 or less.

The polymerization time (period between the start and the end of polymerization) of the polymerization step is preferably 30 minutes to five hours. When the polymerization time is longer, coloring of the polymerization liquid tends to be greater. An aging step (step for keeping the polymerization liquid under warming/incubation conditions after polymerization) may be provided for the purpose of reducing residual monomers in the polymerization liquid after the end of the polymerization. The aging time is commonly one minute to four hours. Further addition of the polymerization initiator during aging is preferable because residual monomers in the polymerization liquid are reduced.

In the polymerization step, it is more preferable to delay the termination time of dropwise addition of the initiator than to delay the termination time of addition of monomers, because residual monomers in the polymerization liquid can be reduced. The termination time is delayed more preferably by 1 to 120 minutes and still more preferably by 5 to 60 minutes.

In the polymerization step, the reaction system may be under normal pressure (atmospheric pressure), reduced pressure, or increased pressure. In view of the molecular weight of obtained polymers, polymerization is preferably performed under normal pressure or under increased pressure with the reaction system sealed. In view of equipment such as a pressurizing device, a pressure-reducing device, and pressure-resistant reaction vessel and piping, polymerization is preferably performed under normal pressure (atmospheric pressure).

The reaction system may be under an air atmosphere but preferably under an inert atmosphere. For example, the atmosphere in the system is preferably substituted with an inert gas such as nitrogen before polymerization.

—Steps Other than the Polymerization Step—

The production method of the present invention includes the above polymerization step, and may further optionally include purification, desalting, condensation, dilution, and drying steps.

The drying step is a step for pulverization and may be carried out by a common method. Pulverization is carried out, for example, by spray drying, freeze drying, liquid-bed drying, drum drying, and belt drying.

In the production method, treatment of the reaction liquid (polymerization liquid) with a cation-exchange resin further improves the color tone of the obtained N-vinyl lactam polymer solution. Such treatment with a cation-exchange resin may be performed during polymerization (in parallel with polymerization step) or after polymerization.

The treatment with a cation-exchange resin during the polymerization reaction can be performed by any appropriate method. Preferably, a cation-exchange resin is added to the reaction vessel in which the monomer component is polymerized. For a specific example, a cation-exchange resin is added to the reaction vessel during polymerization, finely suspended therein, and then filtered.

The time for the treatment with a cation-exchange resin may be any appropriate time, and is preferably one minute to 24 hours. If the treatment time is too short, the effects of the present invention may not be exerted sufficiently. If the treatment time is too long, the productivity is not any more improved. The treatment time is more preferably three minutes to 12 hours, and still more preferably five minutes to two hours.

The method for producing an N-vinyl lactam polymer particularly preferably includes a step of polymerizing a monomer component containing an N-vinyl lactam monomer in an aqueous solvent in the presence of at least one of a water-soluble azo polymerization initiator and a water-soluble organic peroxide, and at least one of hypophosphorous acid and a metal salt of hypophosphorous acid. By such a production method, an N-vinyl lactam polymer having a structural unit including at least one of a hypophosphorous group and a group of hypophosphorous acid metal salt at a main chain terminal is favorably produced. Accordingly, another aspect of the present invention is a method for producing an N-vinyl lactam polymer, the method including the step of polymerizing a monomer component containing an N-vinyl lactam monomer in an aqueous solvent in the presence of at least one of a water-soluble azo polymerization initiator and a water-soluble organic peroxide, and at least one of hypophosphorous acid and a metal salt of hypophosphorous acid.

<N-Vinyl Lactam Polymer Composition>

The N-vinyl lactam polymer of the present invention or an N-vinyl lactam polymer produced by the production method of the present invention may be present in combination with other components (e.g., monomers and byproducts produced in polymerization, residues such as initiators and reducing agents, solvents). Such an N-vinyl lactam polymer composition containing the N-vinyl lactam polymer is another preferable aspect of the present invention.

In the N-vinyl lactam polymer composition, preferably, the total amount of ammonia and ammonium salt (ammonium equivalent) is 0 to 0.1% by mass relative to 100% by mass of the N-vinyl lactam polymer composition. In such an embodiment, odors and coloring (yellowing) are further reduced. More preferably, the total amount is 0 to 0.01% by mass. Still more preferably, the N-vinyl lactam polymer composition contains substantially no ammonia and no ammonium salt.

In the case where the N-vinyl lactam polymer composition is an aqueous solution, the composition preferably contains 1 to 70% by mass of N-vinyl lactam polymers, 30 to 99% by mass of water, and 0 to 1% by mass of other components (residual N-vinyl lactam monomers, and the like).

In the case where the N-vinyl lactam polymer composition is a solid, the composition preferably contains 95 to 100% by mass of N-vinyl lactam polymers and 0 to 5% by mass of other components (water, residual N-vinyl lactams, and the like).

<Applications of N-Vinyl Lactam Polymer>

The N-vinyl lactam polymer of the present invention and an N-vinyl lactam polymer produced by the production method of the present invention may be used for any appropriate applications. Examples of the applications include dispersants, coagulants, thickening agents, pressure-sensitive adhesives, adhesives, surface coating agents, and crosslinking compositions for various inorganic and organic materials. More specific examples thereof include mud dispersants, cement matrix dispersants, metal fine particle dispersants, carbon fiber dispersants, carbon black dispersants, cement matrix thickening agents, detergent builders, dye transfer inhibitors for detergents, heavy metal scavengers, scale inhibitors, metal surface treating agents, dyeing aids, dyeing fixers, foam stabilizers, emulsion stabilizers, ink/dye dispersants, aqueous ink stabilizers, pigment dispersants for coating compositions, thickeners for coating compositions, pressure-sensitive adhesives, paper adhesives, stick glues, medical adhesives, pressure-sensitive adhesives for patches, pressure-sensitive adhesives for cosmetic masks, resin filler dispersants, resin hydrophilizing agents, coating materials for recording paper, surface treating agents for ink-jet printing paper, photosensitive resin dispersants, antistatic agents, moisturizing agents, binders for fertilizers, binders for drug tablets, polymer crosslinking agents, resin compatibility accelerators, photographic chemical additives, cosmetic preparation additives, hair dressing aids, hair spray additives, and sunscreen composition additives. Examples further include various industrial applications (e.g. production of hollow fiber membranes).

Advantageous Effects of Invention

The N-vinyl lactam polymer of the present invention has the structure as mentioned above, and therefore can suppress coloring even at high temperatures and maintain its color tone. Such a polymer can sufficiently suppress a color tone change (yellowing) especially at 200 to 270°.

DESCRIPTION OF EMBODIMENTS

In the following, the present invention is more specifically described with reference to examples. The present invention is not limited only to these examples. The word "part" herein refers to "part by mass" and the word "%" herein refers to "% by mass", unless otherwise specified.

The weight average molecular weight and number average molecular weight of polymers, the quantity of unreacted monomers, the solids content and ammonium content of a polymer composition (polymer aqueous solution) are measured by the following methods.

<Method for Determining the Solids Content of the Polymer Composition (Polymer Aqueous Solution)>

A polymer composition (polymer aqueous solution) (2.0 g) was left in an oven heated to 150° C. in a nitrogen atmosphere for one hour to be dried. Based on the weight change before and after drying, the solids content (%) and the volatile component content (%) were calculated.

<Analysis of Monomers>

Monomers were analyzed under the following conditions by liquid chromatography.
Device: "NANOSPACE SI-2" from Shiseido Company, Limited
Column: "CAPCELLPAK C18 UG120" from Shiseido Company, Limited, 20° C.
Eluent: methanol for LC (from Wako Pure Chemical Industries, Ltd.)/super pure water=1/24 (mass ratio), 1-heptane sulfonic acid (0.4% by mass) added
Flow rate: 100 µL/min <Measurement of the Molecular Weight of Polymers>

The method for determining the K value was employed.

<Analysis of the Structural Unit Including at Least One of a Hypophosphorous Group and a Group of Hypophosphorous Acid Metal Salt in the Polymer>

The structural unit including at least one of a hypophosphorous group and a group of hypophosphorous acid metal salt was quantified by $^{31}$P-NMR.
Measurement Conditions of $^{31}$P-NMR:

The polymer to be measured was dried under reduced pressure at ambient temperature. The resulting solids were dissolved in heavy water (from Aldrich) such that the content was 10% by mass. Then, quantification was performed by using UnityPlus-400 (400 MHz, pulse sequence: s2pu1, measurement interval: 10.000 seconds, pulse: 45.0 degrees, acquisition time: 0.800 seconds, total number of times: 128 times) from Varian.

Based on the integrated intensity ratio obtained by $^{31}$P-NMR, the proportion of the phosphinic acid (salt) group at a main chain terminal of the polymer relative to the whole phosphorus compound was determined. Based on the used amount of the N-vinyl lactam monomer and the phosphorus compound, the proportion (% by mass) of the structural unit including a phosphinic acid (salt) group at a main chain terminal (molecular end) relative to 100% by mass of the total mass of the N-vinyl lactam polymer was calculated. In Examples 2-1 to 2-5, the proportion (% by mass) of the structural unit including the phosphinic acid (salt) group in a molecule was also calculated.

<Measurement of an Ammonium Salt Structure in the Polymer Composition>

The ammonium content in the polymer composition (polymer aqueous solution) was determined by ion chromatograph ("Ion chromatograph system ICS2000" from NIPPON DIONEX K.K., column for measuring basic material: Ionpac CS17, eluent: methane sulfonic acid, flow volume: 1.4 mL/min), and the ammonia content (also referred to as ammonium content) was calculated as the mass ppm relative to the total amount of polyvinyl pyrrolidone in the polymer aqueous solution which was determined separately.

The detection limit of the ammonium content was 1 ppm.

Example 1-1

To a SUS304 reaction vessel equipped with a maxblend (registered trade mark of Sumitomo Heavy industries, Ltd.) mixing blade and a glass lid, ion exchange water (374.5 parts by mass), diethanolamine (0.5 parts by mass), sodium hypophosphite (hereinafter, referred to as "SHP") (25 parts by mass) were charged and heated to 90° C. To the reaction vessel, N-vinylpyrrolidone (hereinafter, referred to as "NVP") (500 parts by mass) was added over 180 minutes and an initiator aqueous solution containing 2,2'-azobis-2-amidinopropane dihydrochloride (Wako Pure Chemical Industries, Ltd., hereinafter, referred to as "V-50") (10 parts by mass) and on exchange water (90 parts by mass) was added over 210 minutes. A booster aqueous solution containing "V-50" (0.5 parts by mass) and ion exchange water (4.5 parts by mass) was added after 210 minutes and 240 minutes of the start of polymerization. As a pH regulator, a 10% by mass malonic acid aqueous solution (8.0 parts by mass) was added 210 minutes after the start of polymerization, so that a polymer composition (1-1) containing a polymer (1-1) with a solid content of 53.6% by mass was obtained. Table 1 shows formulations used in polymerization and Table 2 shows results of the polymerization.

The proportion (% by mass) of the structural unit including at least one of a hypophosphorous group and a group of hypophosphorous acid metal salt at a main chain terminal was 1.4% by mass relative to 100% by mass of the total mass of the N-vinyl lactam polymer.

Examples 1-2 to 1-4

Under the conditions shown in Table 1, polymer compositions (1-2) to (1-4) respectively containing polymers (1-2) to (1-4) were produced in the same manner as in Example 1-1. Table 2 shows the results of the polymerization.

In polymers (1-2) to (1-4), the proportions (% by mass) of the structural unit including at least one of a hypophosphorous group and a group of hypophosphorous acid metal salt at a main chain terminal were respectively 3.6% by mass, 3.2% by mass, and 4.7% by mass relative to 100% by mass of the total mass of the N-vinyl lactam polymer.

Comparative Example 1

To a reactor equipped with a stirrer, a thermometer, and a reflux tube, ion exchange water (634.5 parts) and N-vinylpyrrolidone (160 parts) were charged. To the reactor, diethanolamine (0.02 parts) was further added to adjust the pH of a monomer aqueous solution to 8.3. Nitrogen gas was introduced thereinto while the monomer aqueous solution was stirred for removal of dissolved oxygen. Then, the reactor was heated with stirring to have an internal temperature of 70° C.

To the reactor, a polymerization initiator solution containing 2,2'-azobis(2-methylbutyronitrile) (Wako Pure Chemical Industries, Ltd., hereinafter, referred to as "V-59") (0.35 parts) dissolved in isopropanol (3.7 parts) was added so that polymerization was initiated.

After addition of the polymerization initiator solution, when the internal temperature started increasing due to the polymerization reaction, the jacket water temperature was increased along with the increase of the internal temperature and kept at 90° C.

The reaction was continued about three hours after addition of the polymerization initiator solution. Then, a mixed solution of a 10% by mass malonic acid aqueous solution (1.4 pans) and ion exchange water (0.5 parts) was added to adjust the pH value of the reaction liquid to 3.7. The internal temperature was kept at 90° C. for 90 minutes.

Next, an alkaline solution containing diethanolamine (0.2 parts) dissolved in ion exchange water (2.3 parts) was added to adjust the pH value of the reaction liquid to 6.6. The internal temperature was kept at 90° C. for 30 minutes. In this manner, a comparative polymer composition (1) including a comparative polymer (1) that contains 20 wt % polyvinyl pyrrolidone was obtained. Table 1 shows formulations used in polymerization and Table 2 shows results of the polymerization.

Comparative Example 2

Water (93.8 parts) and 0.1% copper sulfate (II) (0.0046 parts) were charged into a reaction vessel, and heated to 60° C.

Then, while maintaining the temperature at 60° C., a monomer aqueous solution containing N-vinylpyrrolidone (100 parts) and 25% ammonia water (0.6 parts), and a 35% hydrogen peroxide aqueous solution (3.4 parts) were separately dropwise added over 180 minutes.

After the dropwise addition, a 25% ammonia water (0.2 parts) was added. After four hours of the start of the reaction, the reactant was heated to 80° C., and 35% aqueous hydrogen peroxide (0.5 parts) was added thereto. Then, after 5.5 hours of the start of the reaction, 35% aqueous hydrogen peroxide (0.5 parts) was added, and the reactant was held at 80° C. for one hour. In this manner, a comparative polymer composition (2) including a comparative polymer (2) that included 50% polyvinyl pyrrolidone was obtained. Table 1 shows formulations used in polymerization and Table 2 shows results of the polymerization.

Comparative Example 3

In a reaction vessel, 0.025% copper sulfate (II) (1.0 part) and ion exchange water (371.0 parts) were charged, and deaeration with nitrogen was performed (bubbling at 100 ml/min for 30 minutes).

Then, the temperature was raised to 80° C. while nitrogen flowing is performed on the gas phase at a flow rate of 30 ml/min.

With maintenance of the temperature of 80° C. and nitrogen flowing, a monomer solution containing N-vinylpyrrolidone (500.0 parts), 25% ammonia water (0.6 parts), diethanolamine (1.4 parts), and ion exchange water (63.6 parts), and an initiator solution containing 35% hydrogen peroxide (12.5 parts) and ion exchange water (31.9 parts) were respectively dropwise added over 180 minutes. After completion of the dropwise addition, 35% hydrogen peroxide (1.0 part) was added in six aliquots at one hour intervals. As a result of further maintenance at 80° C. for one hour after the sixth addition, a comparative polymer composition (3) containing a comparative polymer (3) that included 50% polyvinyl pyrrolidone was obtained. Table 1 shows formulations used in polymerization and Table 2 shows results of the polymerization.

TABLE 1

|  |  |  | Unit | Example 1-1 | Example 1-2 | Example 1-3 | Example 1-4 | Comparative Example 1 | Comparative Example 2 | Comparative Example 3 |
|---|---|---|---|---|---|---|---|---|---|---|
| Initial charge |  | Ion exchange water | Parts | 374.5 | 374.5 | 349.5 | 339.0 | 634.5 | 93.8 | 371.0 |
|  |  | DEA | Parts | 0.5 | 0.5 | 0.5 | 1.0 | 0.02 | — | — |
|  |  |  | ppm/NVP | 1000 | 1000 | 1000 | 2000 | 125 | — | — |
|  |  | SHP | Parts | 25 | 50 | 25 | 60 | — | — | — |
|  |  |  | % by mass/NVP | 5 | 10 | 5 | 12 | — | — | — |
|  |  | 0.1% copper sulfate (II) | Parts | — | — | — | — | — | 0.0046 | — |
|  |  | 0.025% copper sulfate (II) | Parts | — | — | — | — | — | — | 1.0 |
|  |  | NVP | Parts | — | — | — | — | 160.0 | — | — |
|  |  | V-59 | Parts | — | — | — | — | 0.35 | — | — |
|  |  | Isopropanol | Parts | — | — | — | — | 3.7 | — | — |
| Feeding | Monomer (solution) | NVP | Parts | 500.0 | 500.0 | 500.0 | 500.0 | — | 100.0 | 500.0 |
|  |  | 25% NH$_3$ aq | Parts | — | — | — | — | — | 0.6 | 0.6 |
|  |  | DEA | Parts | — | — | — | — | — | — | 1.4 |
|  |  | Ion exchange water | Parts | — | — | — | — | — | — | 63.6 |
|  | Initiator solution | 35% H$_2$O$_2$ aq | Parts | — | — | — | — | — | 3.4 | 12.5 |
|  |  | V-50 | Parts | 10.0 | 10.0 | — | 10.0 | — | — | — |
|  |  | VA-044 | Parts | — | — | 10.0 | — | — | — | — |
|  |  | Ion exchange water | Parts | 90.0 | 90.0 | 90.0 | 90.0 | — | — | 31.9 |
| Feeding time | Monomer (solution) |  | min-min | 0-180 | 0-180 | 0-180 | 0-180 | — | 0-180 | 0-180 |
|  | Initiator solution |  | min-min | 0-210 | 0-210 | 0-210 | 0-210 | — | 0-180 | 0-180 |
| Polymerization temperature |  |  | ° C. | 90 | 90 | 90 | 90 | 70-90 | 60 (dripping) 80 (aging) | 60 (dripping) 80 (aging) |
| Booster (1) |  | 25% NH$_3$ aq | Parts | — | — | — | — | — | 0.2 | — |
|  |  | Ion exchange water | Parts | — | — | — | — | — | — | — |
|  |  | Number of times | Times | — | — | — | — | — | 1 | — |
| Booster (2) |  | 35% H$_2$O$_2$ aq | Parts | — | — | — | — | — | 0.5 | 1.0/6 |
|  |  | V-50 | Parts | 0.5 | 0.5 | — | 0.5 | — | — | — |
|  |  | VA-044 | Parts | — | — | 0.5 | — | — | — | — |
|  |  | Ion exchange water | Parts | 4.5 | 4.5 | 4.5 | 4.5 | — | — | — |
|  |  | Number of times | Times | 2 | 2 | 2 | 2 | — | 2 | 6 |
| Addition time of Booster (1) |  |  | min | — | — | — | — | — | 180 | — |
| Addition time of Booster (2) |  |  | min | 210, 240 | 210, 240 | 210, 240 | 210, 240 | — | 240, 330 | 180, 240, 300, 360, 420, 480 |
| pH regulator (acid) |  | 10% maloic acid aq | Parts | 8.0 | 8.0 | 8.0 | 8.0 | 1.4 | — | — |
|  |  | Ion exchange water | Parts | — | — | — | — | 0.5 | — | — |
| pH regulator (alkali) |  | DEA | Parts | — | — | — | — | 0.2 | — | — |
|  |  | Ion exchange water | Parts | — | — | — | — | 2.3 | — | — |

In Table 1, "VA-044" means 2,2'-azobis [2-(2-imidazolin-2-yl)propane] dihydrochloride from Wako Pure Chemical Industries, Ltd., "V-501" means 4,4'-azobis (4-cyanovaleric acid) from Wako Pure Chemical Industries, Ltd., and "aq" means an aqueous solution.

The compositions of "monomer (solution)", "initiator solution", "booster (1)", and "booster (2)" in Table 1 were each prepared by mixing the components before addition.

The term "addition time (minutes)" in the booster section indicates when the lump-sum addition of a booster aqueous solution was performed after the start of polymerization. For example, "210, 240" in the section of "addition time of booster (2)" of Examples 1-1 to 1-4, means that the a total amount of the booster (2) was added in a lump sum after 210 minutes and again added in a lump sum after 240 minutes of the start of polymerization.

TABLE 2

|  |  | Example 1-1 | Example 1-2 | Example 1-3 | Example 1-4 | Comparative Example 1 | Comparative Example 2 | Comparative Example 3 | Comparative Example 4 |
|---|---|---|---|---|---|---|---|---|---|
| K value |  | 13.3 | 10.5 | 13.2 | 10.2 | 84.2 | 28.5 | 30.3 | — |
| 10% pH (with no acid added) |  | 6.83 | 6.32 | 6.71 | 5.86 | 5.74 | 3.47 | 3.65 | — |
| Residual NVP content | ppm/as is | 2 | 14 | 35 | 1 | 10 | 1 | 10 | — |
| 2-Pyrrolidone content | ppm/as is | 2793 | 8712 | 4352 | 2006 | 973 | 14826 | 10636 | — |
| Ammonium content | ppm/polyvinyl-pyrrolidone | <1 | <1 | <1 | <1 | <1 | 1839 | 262 | — |

TABLE 2-continued

|  |  | | Example 1-1 | Example 1-2 | Example 1-3 | Example 1-4 | Comparative Example 1 | Comparative Example 2 | Comparative Example 3 | Comparative Example 4 |
|---|---|---|---|---|---|---|---|---|---|---|
| Structural unit including at least one of a hypophosphorous group and a group of hypophosphorous acid metal salt at a molecular end | | | Present | Present | Present | Present | Absent | Absent | Absent | — |
| Proportion (% by mass) of the structural unit relative to polymers | | | 1.4 | 3.6 | 1.6 | 5.6 | 0 | 0 | 0 | — |
| Evaluation on color tone | Yellowness YI | Before heating | 2 | 3 | 6 | 2 | 9 | 14 | 20 | 9 |
| | | After heating | 4 | 3 | 5 | 2 | 48 | 80 | 86 | 33 |
| | b value in the Hunter Lab color space | Before heating | 1.3 | 1.8 | 3.6 | 1.0 | 1.9 | 5.9 | 8.6 | 5.4 |
| | | After heating | 2.2 | 1.5 | 2.9 | 1.3 | 23.3 | 24.8 | 25.6 | 18.3 |

Evaluation Test (Examples 1-1 to 1-4, Comparative Examples 1 to 3)

The color tone of each of the polymer composition obtained in Examples and Comparative Examples was evaluated as described below under high temperature conditions. Table 2 shows the evaluation results.

Each polymer composition was dried by a vacuum dryer for 12 hours. Each dried composition was heated at 260° C. in nitrogen atmosphere for 60 minutes, and then cooled in air. After air cooling in a desiccator, the ambient-temperature sample was subjected to measurement of L, a, and b using a colorimeter under the following conditions.

Device: "colorimeter SE-2000" from NIPPON DENSHOKU INDUSTRIES CO., LTD.

Method: The sample was placed on a quartz cell before and after heating and measured in "reflective mode" with light shielded. The yellow index (YI) was calculated by the following equation based on the obtained L, a, and b.

$$YI = 100 \times (1.28X - 1.06Z)/Y$$

Wherein
$X = X_0 \times \{(Y/Y_0)^{0.333} + a\}^{(1/0.333)}$
$Y = Y_0 \times \{(L+16)/116\}^{(1/0.333)}$
$Z = Z_0 \times \{(Y/Y_0)^{0.333} - b/200\}^{(1/0.333)}$
$X_0 = 0.95045$
$Y_0 = 1$
$Z_0 = 1.08892$ Comparative Example 4

A polymerization vessel equipped with a cooling pipe, a nitrogen introductory line, and a thermometer was charged with ion exchange water (78 parts). Nitrogen was then introduced thereinto so that the atmosphere inside the vessel was converted to nitrogen atmosphere. The polymerization vessel was heated to the inside temperature of 98° C. A monomer solution containing N-vinylpyrrolidone (46.8 parts), 30% hypophosphorous acid (5.46 parts), 25% ammonia aqueous solution (2.11 parts), and ion exchange water (1.2 parts), and an initiator solution containing 4,4'-azobis-4-cyanovaleic acid (NIPPOH CHEMICALS CO., LTD., NC-25) (0.94 parts) triethanolamine (0.98 parts) dissolved in ion exchange water (22.6 parts) each were continuously dropwise added with stirring over one hour. Then, while one hour of heating and stirring, an initiator solution containing NC-25 (0.06 parts) and ethanolamine (0.06 parts) dissolved in ion exchange water (1 part) was added in twice. In this manner, a polymer solution was prepared. With regard to the polymer solution, the color tone under high temperature conditions was evaluated in accordance with the above color tone evaluation test. Table 2 shows the results.

Table 2 shows that the N-vinyl lactam polymer of the present invention has better coloring resistance (fine color tone) under high temperature conditions compared to a conventional N-vinyl lactam polymer.

Example 2-1

To a SUS reaction vessel equipped with a maxblend (registered trade mark of Sumitomo Heavy Industries, Ltd.) mixing blade and a glass lid, ion exchange water (78.2 parts by mass) and $CuSO_4$ (0.000125 parts by mass) were charged and heated to 95 to 98° C. To the reaction vessel, a monomer aqueous solution containing N-vinylpyrrolidone (hereinafter, referred to as "NVP") (250 parts by mass), diethanolamine (hereinafter, referred to as "DEA") (0.25 parts by mass), and ion exchange water (37.5 parts by mass) was added over 180 minutes, a polymerization initiator aqueous solution containing 69% by mass tertiary butylhydroperoxide aqueous solution (NOF CORPORATION, hereinafter, referred to as "69% TBHP") (0.72 parts by mass) and ion exchange water (100 parts) was added over 210 minutes, and a reducing agent aqueous solution containing 5 parts by mass sodium hypophosphite aqueous solution (hereinafter, referred to as "SHP") and ion exchange water (28.3 parts by mass) was added over 165 minutes, A booster aqueous solution containing 2,2'-azobis-2-amidinopropane dihydrochloride (Wako Pure Chemical industries, Ltd., hereinafter, referred to as "V-50") (0.5 parts by mass) and ion exchange water (4.5 parts by mass) was added in a lump sum after 210 minutes and 240 minutes of the start of the polymerization, in this manner, a polymer composition (2-1) containing a polymer (2-1) was prepared.

Examples 2-2 to 2-5

Polymer compositions (2-2) to (2-5) respectively containing polymers (2-2) to (2-5) were prepared in the same manner as in Example 2-1 under the conditions shown in Tables 3 and 4.

Evaluation Test (Examples 2-1 to 2-5)

With regard to each of the polymer compositions obtained in Examples and Comparative Examples, the color tone under high temperature conditions was evaluated in the same manner as in Example 1-1. Table 4 shows the evaluation results.

TABLE 3

| Formulation of raw materials | | Unit | Example 2-1 | Example 2-2 | Example 2-3 | Example 2-4 | Example 2-5 |
|---|---|---|---|---|---|---|---|
| Charge in reactor | Ion exchange water | Parts | 78.2 | 128.4 | 135.1 | 131.8 | 2735.0 |
| | $CuSO_4$ | Parts | 0.000125 | — | — | — | — |
| Dripping monomer | NVP | Parts | 250 | 250 | 250 | 250 | 5000 |
| | 25% $NH_3$ aq | Parts | — | — | — | — | — |
| | DEA | Parts | 0.25 | 0.25 | 0.25 | 0.25 | 5 |
| | Ion exchange water | Parts | 37.5 | 37.5 | 37.5 | 37.5 | 750 |
| Dripping initiator | 35% $H_2O_2$ aq | Parts | — | — | — | — | — |
| | V-50 | Parts | — | 0.5 | 0.5 | 0.5 | 10 |
| | 69% TBHP aq | Parts | 0.72 | — | — | — | — |
| | Ion exchange water | Parts | 100 | 50 | 50 | 50 | 1000 |
| | V-59 | Parts | — | — | — | — | — |
| Dripping reducing agent | IPA | Parts | — | — | — | — | — |
| | SHP | Parts | 5 | 5 | 4 | 1.5 | 50 |
| | Ion exchange water | Parts | 28.3 | 28.3 | 22.7 | 28.5 | 450 |
| Booster (1) | 25% $NH_3$ aq | Parts | — | — | — | — | — |
| | Ion exchange water | Parts | — | — | — | — | — |
| | Number of times | Times | — | — | — | — | — |
| Booster (2) | 35% $H_2O_2$ aq | Parts | — | — | — | — | — |
| | V-50 | Parts | 0.5 | 0.25 | 0.25 | 0.25 | 5 |
| | Ion exchange water | Parts | 4.5 | 2.25 | 2.25 | 2.25 | 45 |
| | Number of times | Times | 2 | 2 | 2 | 2 | 2 |
| pH regulator (acid) | 10% maloic acid aq | Parts | — | — | — | — | 91.65 |
| | Ion exchange water | Parts | — | — | — | — | — |
| pH regulator (alkali) | DEA | Parts | — | — | — | — | — |
| | Ion exchange water | Parts | — | — | — | — | — |

In Table 3, "V-59" means 2,2'-azobis(2-methylbutyronitrile) (Wako Pure Chemical Industries, Ltd.), "IPA" means isopropanol, and "aq" means an aqueous solution.

TABLE 4

| | | | Example 2-1 | Example 2-2 | Example 2-3 | Example 2-4 | Example 2-5 |
|---|---|---|---|---|---|---|---|
| Reaction temperature | | °C. | 95-98 | 95-98 | 95-98 | 95-98 | 95-98 |
| Dropwise addition time | Monomer | min | 0-180 | 0-180 | 0-180 | 0-180 | 0-180 |
| | Initiator | min | 0-210 | 0-210 | 0-210 | 0-210 | 0-210 |
| | Reducing agent | min | 0-165 | 0-165 | 0-165 | 0-165 | 0-165 |
| | Booster (1) | min | — | — | — | — | — |
| | Booster (2) | min | 210, 240 | 210, 240 | 210, 240 | 210, 240 | 210, 240 |
| Ammonium content | | ppm/polyvinylpyrrolidone | <1 | <1 | <1 | <1 | <1 |
| Structural unit including at least one of a hypophosphorous group and a group of hypophosphorous acid metal salt | | | Phosphinic acid group | Phosphinic acid group | Phosphinic acid group | Phosphinic acid group | Phosphinic acid group |
| % by mass of the structural unit (relative to polymers) In molecule/Molecular end | | | 0.2/0.8 | 0.4/0.9 | 0.4/1.0 | 0.2/1.3 | 0.5/0.9 |
| Evaluation results on color tone | Yellowness YI | Before heating | 14 | 9 | 9 | 7 | 7 |
| | | After heating | 18 | 17 | 11 | 14 | 10 |
| | b value in the Hunter Lab color space | Before heating | 5.44 | 1.61 | 1.55 | 0.85 | 0.35 |
| | | After heating | 7.1 | 5.69 | 2.91 | 3.00 | 2.16 |
| Molecular weight of polymers (K value) | | | 26.5 | 23.7 | 23.7 | 34.4 | 29.7 |

The term "dropwise addition time (minutes)" in the section of boosters of Table 4 indicates when a booster aqueous solution was added in a lump sum after the start of polymerization. For example, "210, 240" in the section of booster (2) in Examples 2-1 to 2-5 indicates that a total amount of the booster (2) was added in a lump sum after 210 minutes and again added in a lump sum after 240 minutes of the start of polymerization.

In comparison between Examples 2-1 to 2-5 in Table 4 and Comparative Examples 1 to 3 in Table 2, the N-vinyl lactam polymer of the present invention is clarified to have better coloring resistance (fine color tone) under high temperature conditions than a conventional N-vinyl lactam polymer.

The invention claimed is:

1. An N-vinyl lactam polymer comprising a structural unit derived from an N-vinyl lactam monomer, the N-vinyl lactam polymer including a structural unit that has at least one of a hypophosphorous group and a group of hypophosphorous acid metal salt at a main chain terminal,
wherein the proportion of the structural unit derived from the N-vinyl lactam monomer is 100% by mass relative to 100% by mass of the structural unit derived from all the monomers in the N-vinyl lactam polymer;
and wherein the proportion of the structural unit derived from at least one hypophosphorus group and a group of hypophosphorous acid metal salt at a main chain terminal is 0.3% by mass or more.

2. The N-vinyl lactam polymer according to claim 1, wherein the N-vinyl lactam polymer has a K value of 5 or more but less than 15.

3. An N-vinyl lactam polymer composition comprising the N-vinyl lactam polymer according to claim 1, the N-vinyl lactam polymer composition containing 0 to 0.1% by mass of ammonia and ammonium salt in total (ammonium equivalent) relative to 100% by mass of the N-vinyl lactam polymer composition.

4. A method for producing an N-vinyl lactam polymer, the method comprising a step of polymerizing a monomer component containing a N-vinyl lactam monomer in an aqueous solvent in the presence of at least one of a water-soluble azo polymerization initiator and a water-soluble organic peroxide and at least one of hypophosphorous acid and a metal salt of hypophosphorous acid, wherein the proportion of the N-vinyl lactam monomer is 100% by mass relative to 100% by mass of the whole monomer component.

5. An N-vinyl lactam polymer composition comprising, the N-vinyl lactam polymer according to claim 2, the N-vinyl lactam polymer composition containing, 0 to 0.1% by mass of ammonia and ammonium salt in total (ammonium equivalent) relative to 100% by mass of the N-vinyl lactam polymer composition.

6. The N-vinyl lactam polymer according to claim 1, wherein the N-vinyl lactam polymer has a K value of 5 to 40.

* * * * *

UNITED STATES PATENT AND TRADEMARK OFFICE
CERTIFICATE OF CORRECTION

PATENT NO. : 9,212,237 B2  
APPLICATION NO. : 13/823553  
DATED : December 15, 2015  
INVENTOR(S) : Kozuki et al.

Page 1 of 1

It is certified that error appears in the above-identified patent and that said Letters Patent is hereby corrected as shown below:

In the Claims:

Column 24, claim 1, line 60, delete "at least one hypophosphorus group" insert -- at least one of a hypophosphorous group --;

Column 25, claim 5, line 15, after "comprising", delete ",";

Column 25, claim 5, lines 17, after "containing", delete ",".

Signed and Sealed this  
Fifth Day of July, 2016

Michelle K. Lee  
*Director of the United States Patent and Trademark Office*